US009820088B2

(12) United States Patent
Keskitalo et al.

(10) Patent No.: US 9,820,088 B2
(45) Date of Patent: Nov. 14, 2017

(54) METHOD AND A TECHNICAL EQUIPMENT FOR A NOTIFICATION SERVICE

(71) Applicant: NOKIA TECHNOLOGIES OY, Espoo (FI)

(72) Inventors: Tuomas Veli Keskitalo, Oulunsalo (FI); Tommi Heinonen, Oulu (FI); Ari Antero Aarnio, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/712,511

(22) Filed: Dec. 12, 2012

(65) Prior Publication Data

US 2014/0164557 A1   Jun. 12, 2014

(51) Int. Cl.
*G06F 15/173* (2006.01)
*H04W 4/02* (2009.01)

(52) U.S. Cl.
CPC .................... *H04W 4/02* (2013.01)

(58) Field of Classification Search
CPC .................................. H04L 12/5865
USPC ......................................... 709/213
See application file for complete search history.

(56) References Cited

U.S. PATENT DOCUMENTS

| 7,412,400 | B1 | 8/2008 | Bhela et al. | |
|---|---|---|---|---|
| 8,310,361 | B1* | 11/2012 | Stout | G06F 17/30241 340/539.11 |
| 2002/0111154 | A1* | 8/2002 | Eldering | H04M 3/4872 455/414.1 |
| 2008/0086356 | A1* | 4/2008 | Glassman | G06Q 30/0242 705/14.41 |
| 2009/0005077 | A1 | 1/2009 | Forstall et al. | |
| 2009/0006194 | A1* | 1/2009 | Sridharan | G06Q 30/02 705/14.62 |
| 2009/0325606 | A1* | 12/2009 | Farris | H04W 4/02 455/456.3 |
| 2010/0222078 | A1 | 9/2010 | Tysowski | |

(Continued)

FOREIGN PATENT DOCUMENTS

| EP | 2 278 540 A1 | 1/2011 |
|---|---|---|
| WO | 2008/027851 A1 | 3/2008 |

OTHER PUBLICATIONS

Notification of Transmittal of the International Search Report and the Written Opinion of the International Searching Authority, or the Declaration; International Search Report; Written Opinion for corresponding International Application No. PCT/FI2013/051128, dated Mar. 20, 2014, 12 pages.

(Continued)

*Primary Examiner* — Hamza Algibhah
(74) *Attorney, Agent, or Firm* — Ditthavong & Steiner, P.C.

(57) ABSTRACT

There are disclosed various methods and apparatuses notification service. In some embodiments the method comprises receiving an indication from a client device, which indication relates to a location; creating a subscription between the client and the location owner of said location being selected, and based on the subscription, transmitting notifications relating to the location to the client device. In some other embodiments, the method comprises selecting a location by an apparatus; transmitting an indication relating to said location to a server to have a subscription with a location owner of said location; based on the subscription, receiving notifications from the location owner.

22 Claims, 10 Drawing Sheets

(56) References Cited

U.S. PATENT DOCUMENTS

| | | | | |
|---|---|---|---|---|
| 2010/0302056 | A1* | 12/2010 | Dutton et al. | 340/825.49 |
| 2011/0082746 | A1* | 4/2011 | Rice | G06Q 30/02 705/14.56 |
| 2011/0130155 | A1* | 6/2011 | Brown | G06Q 10/10 455/456.2 |
| 2011/0131092 | A1* | 6/2011 | Han | 705/14.49 |
| 2011/0214051 | A1* | 9/2011 | Petronijevic | G06F 17/30569 715/255 |
| 2012/0135746 | A1* | 5/2012 | Mohlig et al. | 455/456.1 |
| 2012/0202525 | A1* | 8/2012 | Pettini | H04W 4/043 455/456.3 |
| 2012/0226554 | A1* | 9/2012 | Schmidt et al. | 705/14.58 |
| 2012/0231795 | A1* | 9/2012 | Witzel | H04W 76/007 455/436 |
| 2013/0046636 | A1* | 2/2013 | Asnake | G06Q 30/0261 705/14.63 |
| 2014/0074940 | A1* | 3/2014 | Chen | G01C 21/362 709/206 |
| 2014/0153457 | A1* | 6/2014 | Liu | H04W 52/0222 370/311 |
| 2014/0342761 | A1* | 11/2014 | Kolodziej | H04W 4/14 455/466 |

OTHER PUBLICATIONS

Virrantaus et al., "Developing GIS-Supported Location-Based Services", vol. 2, 2001, Proceedings of the Second International Conference, 11 pages.

\* cited by examiner

METHOD AND A TECHNICAL EQUIPMENT FOR A NOTIFICATION SERVICE

Mobile devices, like smart phones, tables etc. are devices with numerous applications to be used in several areas of life in addition to communication capabilities. For example, mobile devices provide a possibility to listen music, to watch television, to have communication with someone, to schedule meetings, to create notes, to access web sites, to get navigation instructions, to view map, to determine location, to receive advertisements just to mention few.

Some of the functionalities (e.g. advertising) are based on push-messaging being received from a service provider. Push-messaging is a technology, by means of which a service provider, or a merchant, or any other party can inform a client on a new content in a service or in an information channel of the service provider.

There is a need for a sophisticated push-notification service that is able to notify customers according to customer's desires and also better user experience of the devices.

SUMMARY

Some embodiments provide a method and an apparatus for a notification service. Some embodiments provide a method and an apparatus for a client of the notification service.

Various aspects of examples of the invention are provided in the detailed description.

According to a first aspect, there is provided a method comprising: comprising receiving an indication from a client device, which indication relates to a location; creating a subscription between the client and the location owner of said location being selected, and based on the subscription, transmitting notifications relating to the location to the client device.

According to a second aspect, there is provided an apparatus comprising at least one processor, memory including computer program code, the memory and the computer program code configured to, with the at least one processor, cause the apparatus to perform at least the following: receive an indication from a client device, which indication relates to a location; create a subscription between the client and the location owner of said location being selected, and based on the subscription, transmit notifications relating to the location to the client device.

According to a third aspect, there is provided a computer-readable storage medium carrying one or more sequences of one or more instructions which, when executed by one or more processors, cause an apparatus to perform at least the following: receive an indication from a client device, which indication relates to a location; create a subscription between the client and the location owner of said location being selected, and based on the subscription, transmit notifications relating to the location to the client device.

According to a fourth aspect, there is provided an apparatus comprising means for: receiving an indication from a client device, which indication relates to a location; creating a subscription between the client and the location owner of said location being selected, and based on the subscription, transmitting notifications relating to the location to the client device.

According to an embodiment, the location relates to a place on an electronic map.

According to an embodiment, notifications relating to the location are received from the location owner.

According to an embodiment, the indication is client device's selection to follow said location.

According to an embodiment, the notifications are transmitted by means of messaging.

According to an embodiment, the notifications are transmitted to an electronic map to be displayed with the location or in the mobile device.

According to an embodiment, notifications comprise at least one of the following: a category, a subclass.

According to a one aspect, there is provided a method comprising: selecting a location by an apparatus; transmitting an indication relating to said location to a server to have a subscription with a location owner of said location; and based on the subscription, receiving notifications from the location owner.

According to a another aspect, there is provided an apparatus comprising at least one processor, memory including computer program code, the memory and the computer program code configured to, with the at least one processor, cause the apparatus to perform at least the following: select a location by the apparatus; transmit an indication relating to said location to a server to have a subscription with a location owner of said location; based on the subscription, receive notifications from the location owner.

According to another aspect, there is provided a computer-readable storage medium carrying one or more sequences of one or more instructions which, when executed by one or more processors, cause an apparatus to perform at least the following: select a location by an apparatus; transmit an indication relating to said location to a server to have a subscription with a location owner of said location; and based on the subscription, receive notifications from the location owner.

According to another aspect there is provided an apparatus comprising means for: selecting a location by an apparatus; transmitting an indication relating to said location to a server to have a subscription with a location owner of said location; and based on the subscription, receiving notifications from the location owner.

According to an embodiment, the location is selected from an electronic map.

According to an embodiment, the location is selected to be the location where the apparatus is located at that moment.

According to an embodiment, a location from an identification tag is received, which received location is selected.

According to an embodiment, the indication is a selection to follow said location.

According to an embodiment, notifications are received by means of messaging service.

According to an embodiment, notifications are received on a map being displayed with the location.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-34, and 54-56.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

The present embodiments relate to a notification system providing location-based push-notifications. Push-notifications are based on local subscriptions, for example on points of interests (POI). A publisher, e.g. a merchant can add a certain place "X" into a map application. When an end user indicates his/her interest on the place "X", e.g. by selecting "follow" function for the place "X", a subscription relationship is generated between place "X" and the user. This provides to the publisher the right to send push notifications to mobile device of said user or the application in the mobile device, like the map application or any other application specific notification. The notifications may be sent regardless of the location the user is having at the moment. Advantage or the application specific notifications is that the user when using the specific application is that the user only sees automatically the notification specific to the application. That is possible when the notification has an identification of the application in the message relating to the specific application. Maybe in one embodiment the message itself, e.g. body, can have an indication to the application. In one embodiment also the application itself may have subclasses and that could be embedded to the message or that can be recognized from the message. Thus e.g. the map application can have point-of-interest (POI) related push message but also the message which is e.g. POI owner related message, then that POI owner related message is treated e.g. as additional category of the message and will relate e.g. only to certain field of the POI information. Maybe in one embodiment this kind message could be just updated into the POI information as it has not so big importance to show to user and may be updated without showing to the user. In one embodiment the POI can be started to be followed based on clicking the follow button in the web browser of the map registration when on the site of the merchant. In one further embodiment user can start to follow the POI by checking out the merchant place. In one additional embodiment the user can start to follow the POI by navigating to the POI. Follow-up dialog usually contains the questionnaire to the user "Do you want to follow the POI?".

Figure 1:
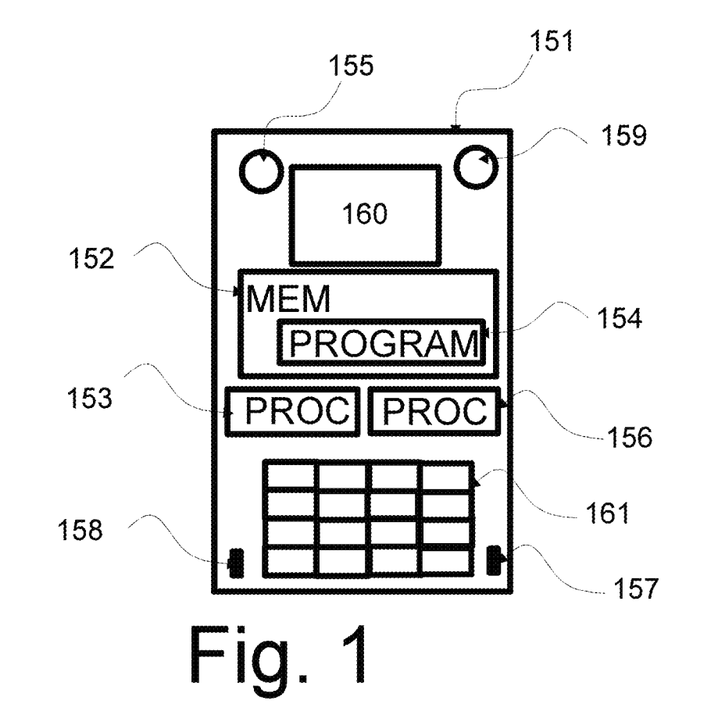
FIG. 1 shows an apparatus according to an embodiment.

FIG. 1 illustrates an example of an apparatus, for example a smart phone according to an embodiment. Other examples of the apparatus are a laptop computer, a tablet computer, a mobile phone. The apparatus 151 contains memory 152, at least one processor 153 and 156, and computer program code 154 residing in the memory 152. The apparatus according to the example of FIG. 1, also has one or more cameras 155 and 159 for capturing image data, for example stereo video. The apparatus of this example also contains one, two or more microphones 157 and 158 for capturing sound. The apparatus may also contain sensor for generating sensor data relating to the apparatus' relationship to the surroundings. The apparatus also comprises a display 160 for viewing single-view, stereoscopic (2-view) or multiview (more-than-2-view) images. The display 160 may be extended at least partly on the back cover of the apparatus. The apparatus 151 also comprises an interface means (e.g. a user interface) which allows a user to interact with the apparatus. The user interface means is implemented either using one or more of the following: the display 160, a keypad 161, voice control, or other structures. The apparatus is configured to connect to another device e.g. by means of a communication block (not shown in FIG. 1) able to receive and/or transmit information. For the purposes of the present embodiments, the apparatus comprises various applications stored in the memory 152. Examples of the applications are a navigation (e.g. driving instruction) application and a map application. As an alternative, the apparatus may be connected to a server in order to use such navigation and map application. Offline use of applications is also possible. More applications can be downloaded e.g. from application stores.

Figure 2:
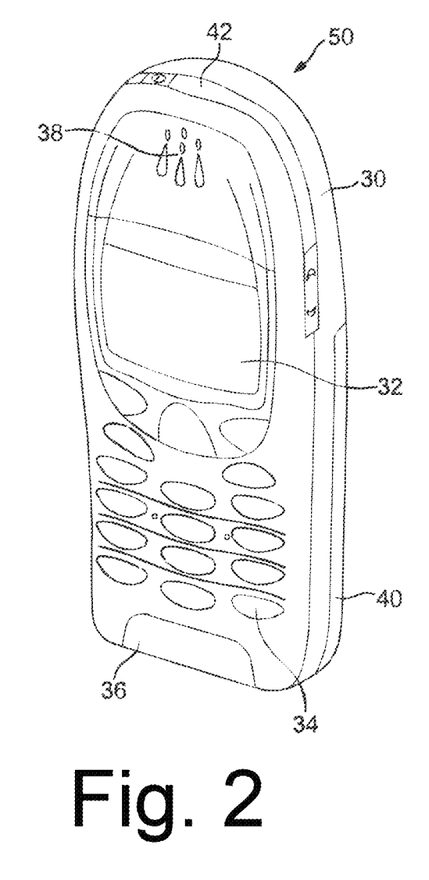
FIG. 2 shows a layout of an apparatus according to an embodiment.

FIG. 2 shows a layout of an apparatus according to an example embodiment. The electronic device 50 is for example a mobile terminal (e.g. mobile phone, a smart phone, a camera device, a tablet device) or other user equipment of a wireless communication system. Embodiments of the invention may be implemented within any electronic device or apparatus, such a personal computer and a laptop computer.

The apparatus 50 shown in FIG. 2 comprises a housing 30 for incorporating and protecting the device. The apparatus 50 further comprises a display 32 in the form of e.g. a liquid crystal display. In other embodiments of the invention the display is any suitable display technology suitable to display user interface for the various applications in the apparatus. The apparatus 50 further comprises a keypad 34 or other data input means. In other embodiments of the invention any suitable data or user interface mechanism may be employed. For example the user interface may be implemented as a virtual keyboard or data entry system as part of a touch-sensitive display. The apparatus comprises a microphone 36 or any suitable audio input which may be a digital or analogue signal input. The apparatus 50 further comprises an audio output device which in embodiments of the invention may be any one of: an earpiece 38, speaker, or an analogue audio or digital audio output connection. The apparatus 50 of FIG. 2 also comprises a battery 40 (or in other embodiments of the invention the device may be powered by any suitable mobile energy device such as solar cell, fuel cell or clockwork generator). The apparatus according to an embodiment comprises an infrared port 42 for short range line of sight communication to other devices. In other embodiments the apparatus 50 may further comprise any suitable short range communication solution such as for example a Bluetooth wireless connection, a USB/firewire wired connection, Near Field Communication (NFC) connection, Radio-Frequency Identification (RFID) connection or Bluetooth Low Energy connection.

Figure 3:
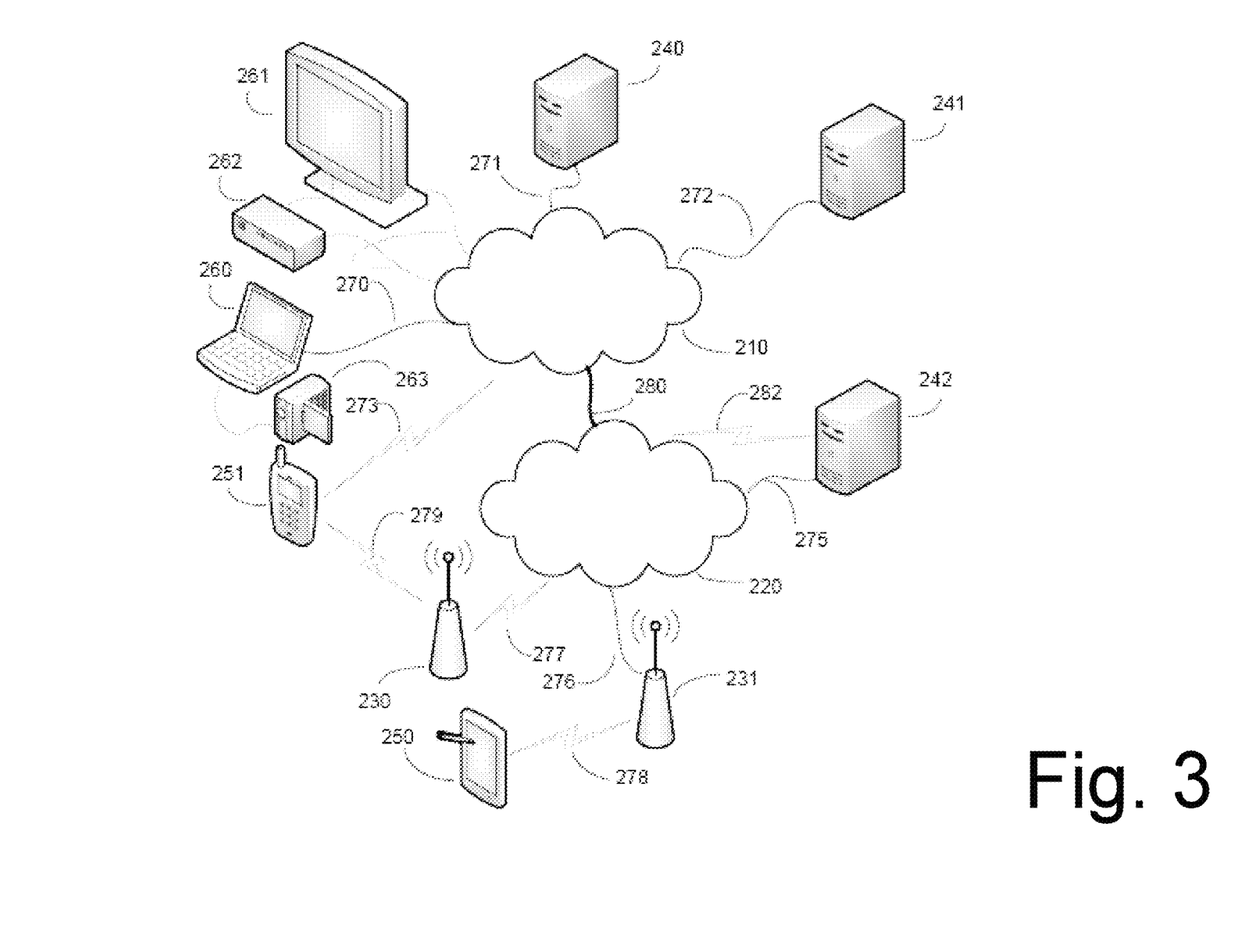
FIG. 3 shows a network system according to an embodiment.

FIG. 3 illustrates a network system according to an embodiment. In FIG. 3, the different devices may be connected via a fixed network 210 such as the Internet or a local area network; or a mobile communication network 220 such as the Global System for Mobile communications (GSM) network, 3rd Generation (3G) network, 3.5th Generation (3.5G) network, 4th Generation (4G) network, Wireless Local Area Network (WLAN), Bluetooth®, or other contemporary and future networks. Different networks are connected to each other by means of a communication interface 280. The networks comprise network elements such as routers and switches to handle data (not shown), and communication interfaces such as the base stations 230 and 231 in order for providing access for the different devices to the network, and the base stations 230, 231 are themselves connected to the mobile network 220 via a fixed connection 276 or a wireless connection 277.

There may be a number of servers connected to the network, and in the example of FIG. 1 are shown servers 240, 241 and 242, each connected to the mobile network 220, which servers, or one of the servers, may be arranged to operate as computing nodes (i.e. to form a cluster of computing nodes or a so-called server farm). Some of the above devices, for example the computers 240, 241, 242 may be such that they are arranged to make up a connection to the Internet with the communication elements residing in the fixed network 210. For the purposes of the present embodiments, a server can provide one or more of the following services: location service, notification service, a user account for an apparatus. Alternatively, there can be more than one server in the network system for sharing said services.

There are also a number of end-user devices such as mobile phones and smart phones 251 for the purposes of the present embodiments, Internet access devices (Internet tablets) 250, personal computers 260 of various sizes and formats, and computing devices 261, 262 of various sizes and formats. These devices 250, 251, 260, 261, 262 and 263 can also be made of multiple parts. In this example, the various devices are connected to the networks 210 and 220 via communication connections such as a fixed connection 270, 271, 272 and 280 to the internet, a wireless connection 273 to the internet 210, a fixed connection 275 to the mobile network 220, and a wireless connection 278, 279 and 282 to the mobile network 220. The connections 271-282 are implemented by means of communication interfaces at the respective ends of the communication connection. All or some of these devices 250, 251, 260, 261, 262 and 263 are configured to access a server 240, 241, 242 and a social network service.

Figure 4:
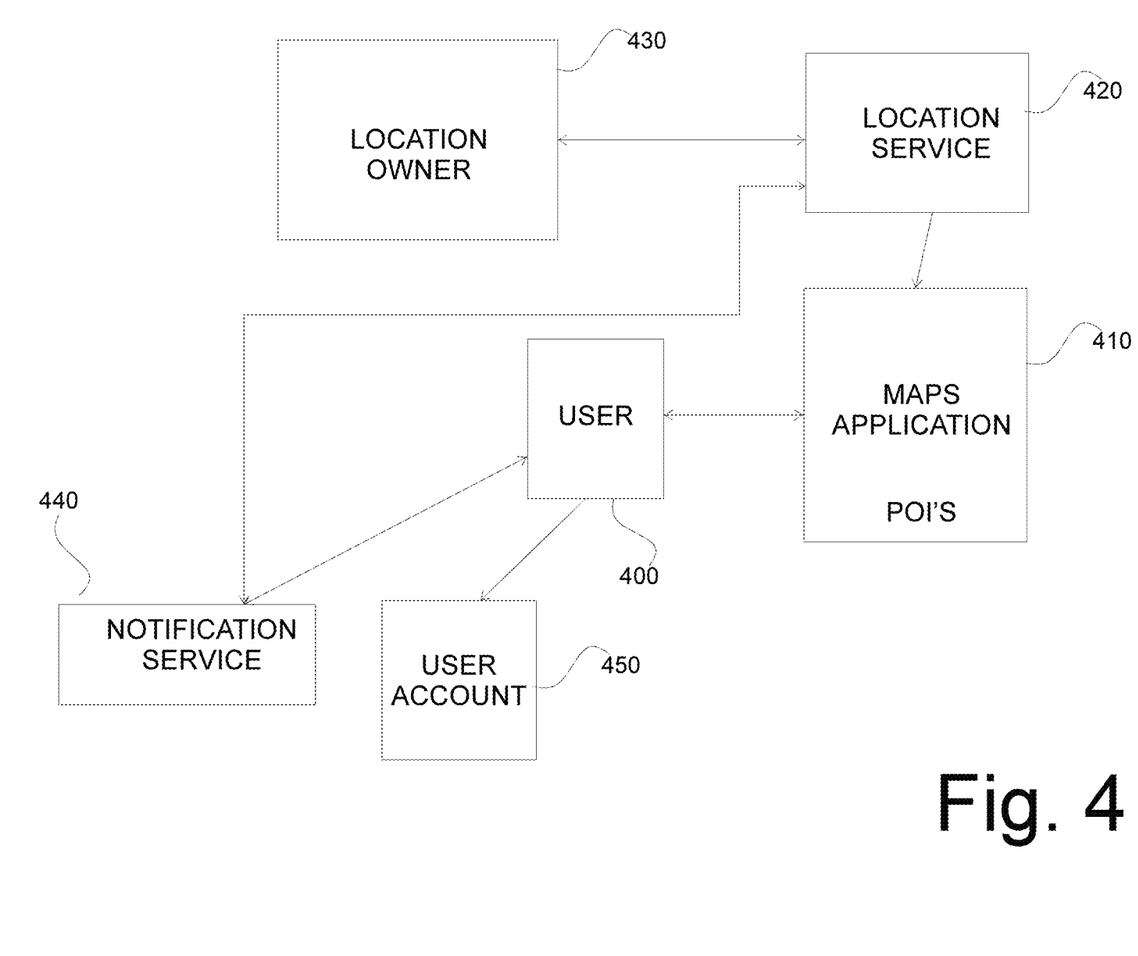
FIG. 4 shows a notification system according to an embodiment.

FIG. 4 shows an example of a notification system that can operate on a network system of FIG. 3 according to an embodiment. In FIG. 4, there is shown a user 400 of the device that has a user account 450 on an account server, and that is able to use a maps application 410 on his/her apparatus or on a server. The maps application 410 can obtain location data (i.e. points-of-interest) from a location service 420, which location service 420 is updated and built up by location owner(s) 430, or service providers, like map data providers. When e.g. a location owner 430 updates data, e.g. location data in the location service 420, information of the data can be sent to user's device via a notification service 440 if the user 400 has been subscribed to the notification service 440.

Figure 5:
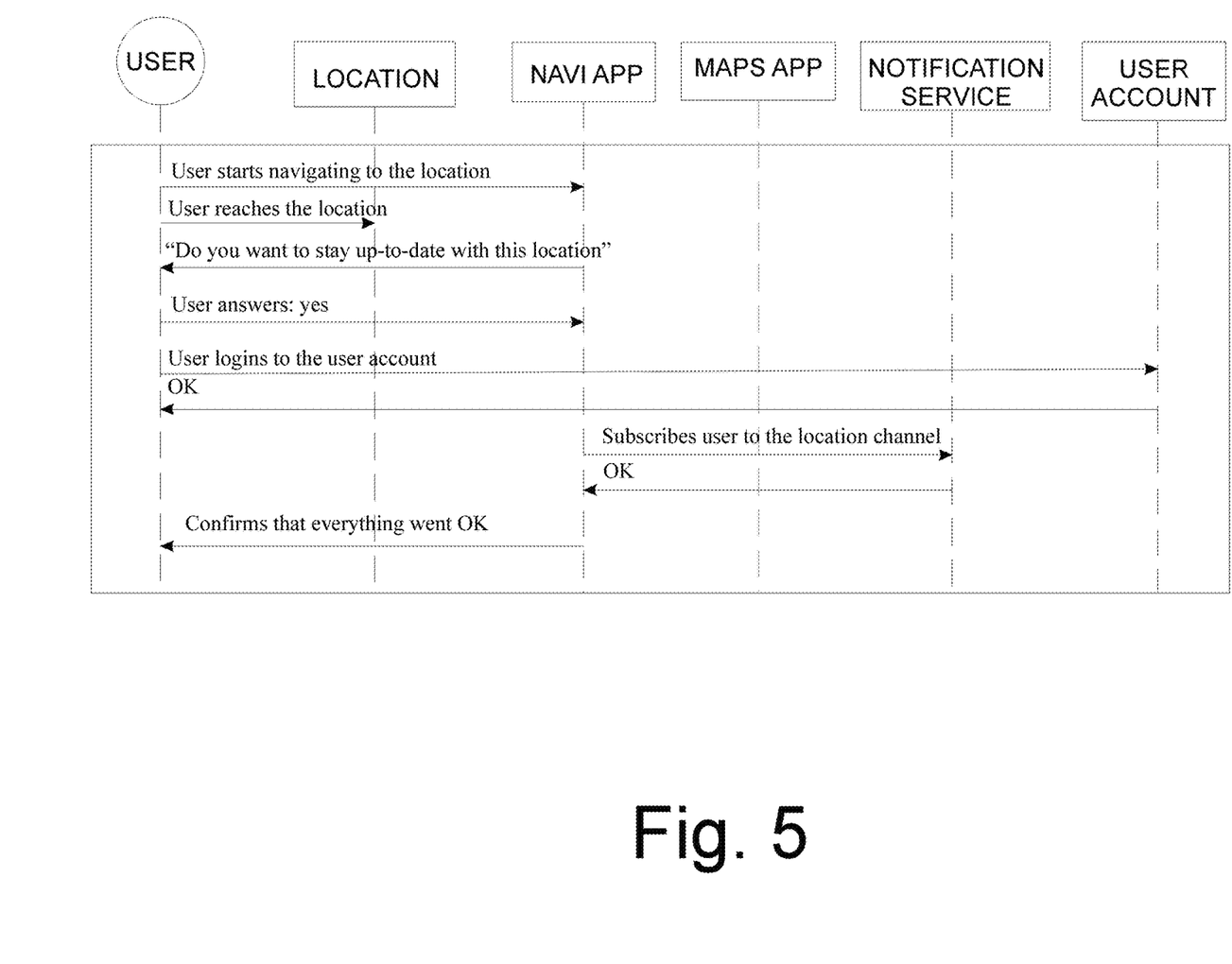
FIG. 5 shows a method for subscribing a user to a notification system according to an embodiment.

In the following, examples for user subscription for a location channel and a location registration for location owner are disclosed:

According to an embodiment, shown in FIG. 5, a location channel subscription for a user is carried out as follows:

In an embodiment, the user has a navigation application running, and the user starts navigating to a location by means of the navigation application. For example, the user has defined a destination or an intermediate location to the navigation application, towards which the navigation application guides the user. When the user reaches the defined location, the navigation application is configured to show a dialog on a display of the user apparatus, for example "Do you want to stay up-to-date with this location?". In one embodiment the user can get the "follow-up" question before navigation is started, e.g. when selecting the destination. That can happen clicking twice the destination on the map or the destination "word". The word may be, e.g., "O'Hara Mall." When the "following" is started during inputting navigation destination, as a response to the registration request that the user device has registered, the service will enable to send the notification messages to the registered device during the travel to the destination, so that user has the latest notifications in his device when he has arrived the destination. Also the registration might be only valid during the travel and when staying in the destination area. When leaving the destination the registration may be ended (registration end message is sent to the service) and then the notification messages will be deleted in the device and no more messages are sent.

Also audio and/or long pressing can be used to agree with to get the messages. The content of the dialog may vary, however, the purpose of the dialog is to give the user a possibility to start following the location. In here, "following" relates to user's permission to send information/notifications from a server to the user's apparatus. In an embodiment when the user opens the map or navigation application the notification messages received after last usage of the application can be shown to the user that he knows what kind of updates has been arrived since last use of map or navigation application. The amount of messages can be limited by only showing valid messages, etc. The device can update those POIs without any user interactions, but user can also prepare the profile from the POIs so that only the POIs "she/he likes" are updated. Also the update can relate to environment he usually is within. Also user can get notification messages only in the areas he is usually within. Furthermore in some embodiments, user can select from the list of malls, shops, merchants he likes. Thus then he only receives messages on the map application from those entities. User can also draw an area on the map application to show which of the areas he is interested in to get the messages. In one embodiment user can add one or more notes to the map application that when the match between the note and the notification message is the result the notification message will be shown in the POI. Then the others might not be shown. The user can send the add one or more notes to the notification server so that the server does not send unwanted messages at all.

In one embodiment, the notification messages are activated only for navigation time and then they are relevant to the route traveled. In another embodiment, a public transport navigation application (e.g., Nokia Transport) can be used which helps users travel to places by using public transportation. By setting the destination, the public transport navigation application will tell when the next train, bus, or tram is arriving, right to the to the nearest minute. The application will also guide the user to the nearest stop or station, listing transfers and changes on the way, with step-by-step walking directions. In addition, the application will even tell when to get off. Thus, the registration to the notification service can be based on one or more transportation lines or their routes and the notifications can be linked to one or more POIs (e.g. only POIs in certain bus stops, or only e.g. in destination) of the map data which are along the route. The "following" dialog can be asked e.g. during setting the transportation route or during travelling the route. User can also give consent to this application so that it is always in the following mode. The POI can be also a route of the line. Then the user can subscribe the route when selecting the transportation. The selection can be embedded to the transportation application and it is activated when selecting the transportation route/line/s. A route/line dimension could be added as a criteria to the POI. Thus either route/line or location can be linked to the service and user can get the notification based on either criteria.

In one embodiment, the time dependent notification messages can be built so that there are a group of messages that can be received by the mobile device when registered to the location or the route/line. To the notifications it can be provided also time and location dependency, only those devices will be receiving the messages which follow the location, but from that group only those are during the time interval are in the location. Further the messages are sent only when the line/route can be used i.e. when the bus or the like is running in the line/route. The schedule of the transportation means can reflect to the transmission of the messages.

The social network and the friends of the user can be linked to give the recommendation to the POIs which ones to select for registration. A database of the recommendations and links between the friends can be used to make the match with the POIs in the map data. This match can be shown in user's device when he does selections for registration to better select something what somebody else has earlier liked.

If the user answers "Yes" to the dialog, or in some other way indicates his/her permission, the user is directed to login into a user account in a server—if not already being logged in. When the user is logged in, the navigation application is configured to subscribe the user to the location channel on the notification service. When these steps have been performed, the user is confirmed on the subscription. In an embodiment, the navigation application is an example of the service. Other examples may be the applications (apps) the user has in his device. The notification service can be subscribed without the need to specify it to any application, but can be a general subscription for all services and the subscription can be registered at once to all services.

Figure 6:
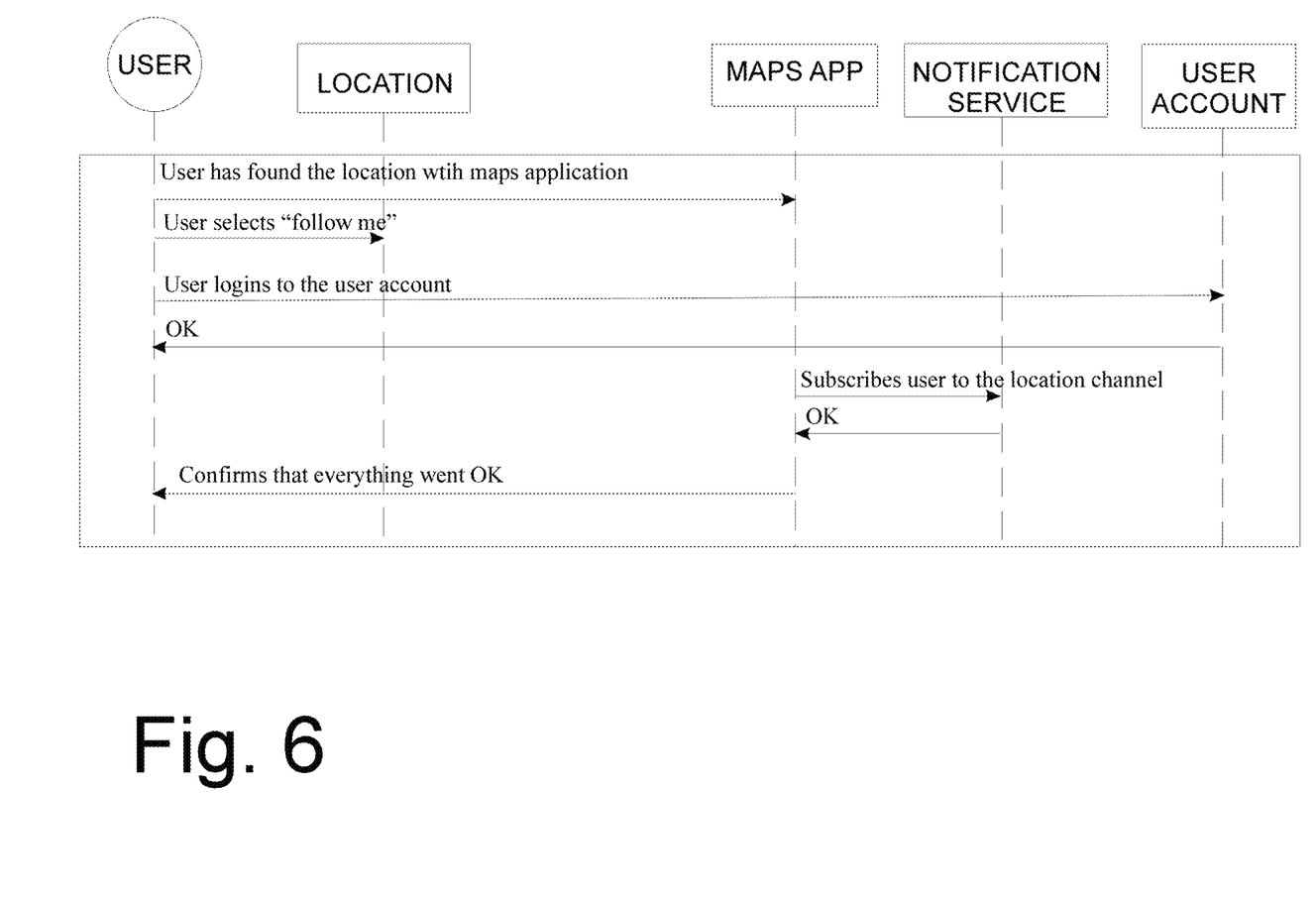
FIG. 6 shows a method for subscribing a user to a notification system according to another embodiment.
Figure 7:
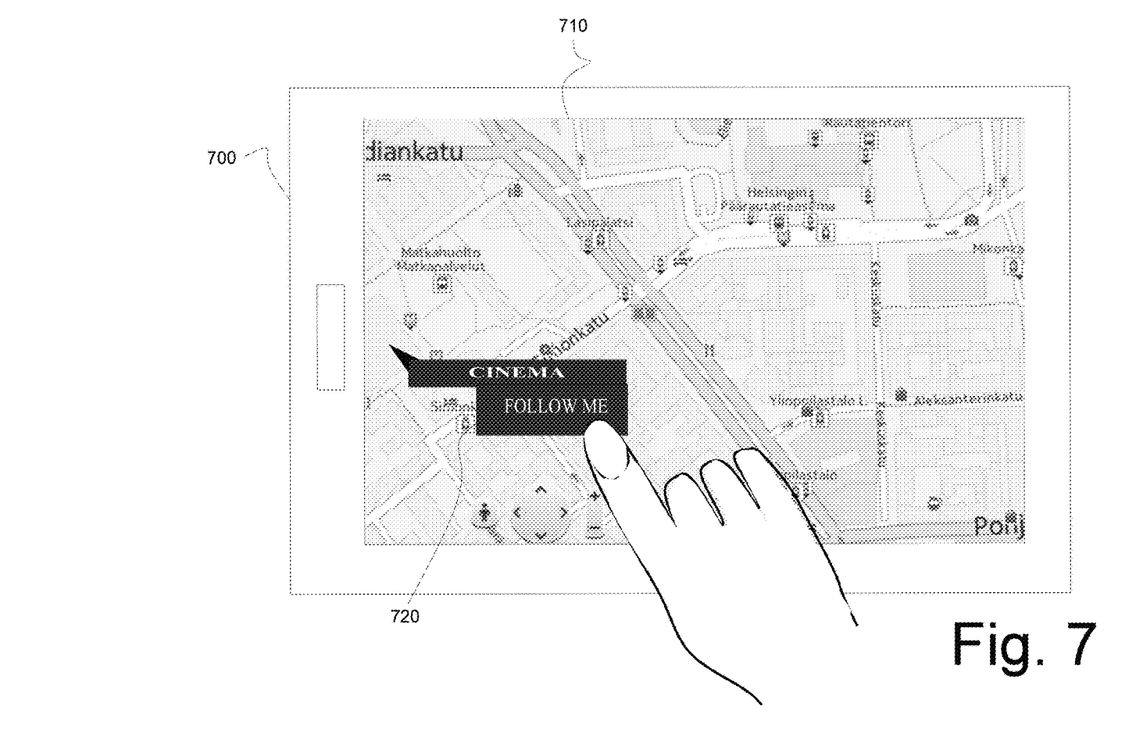
FIG. 7 shows a user interface view of a map application according to an embodiment.
Figure 8:
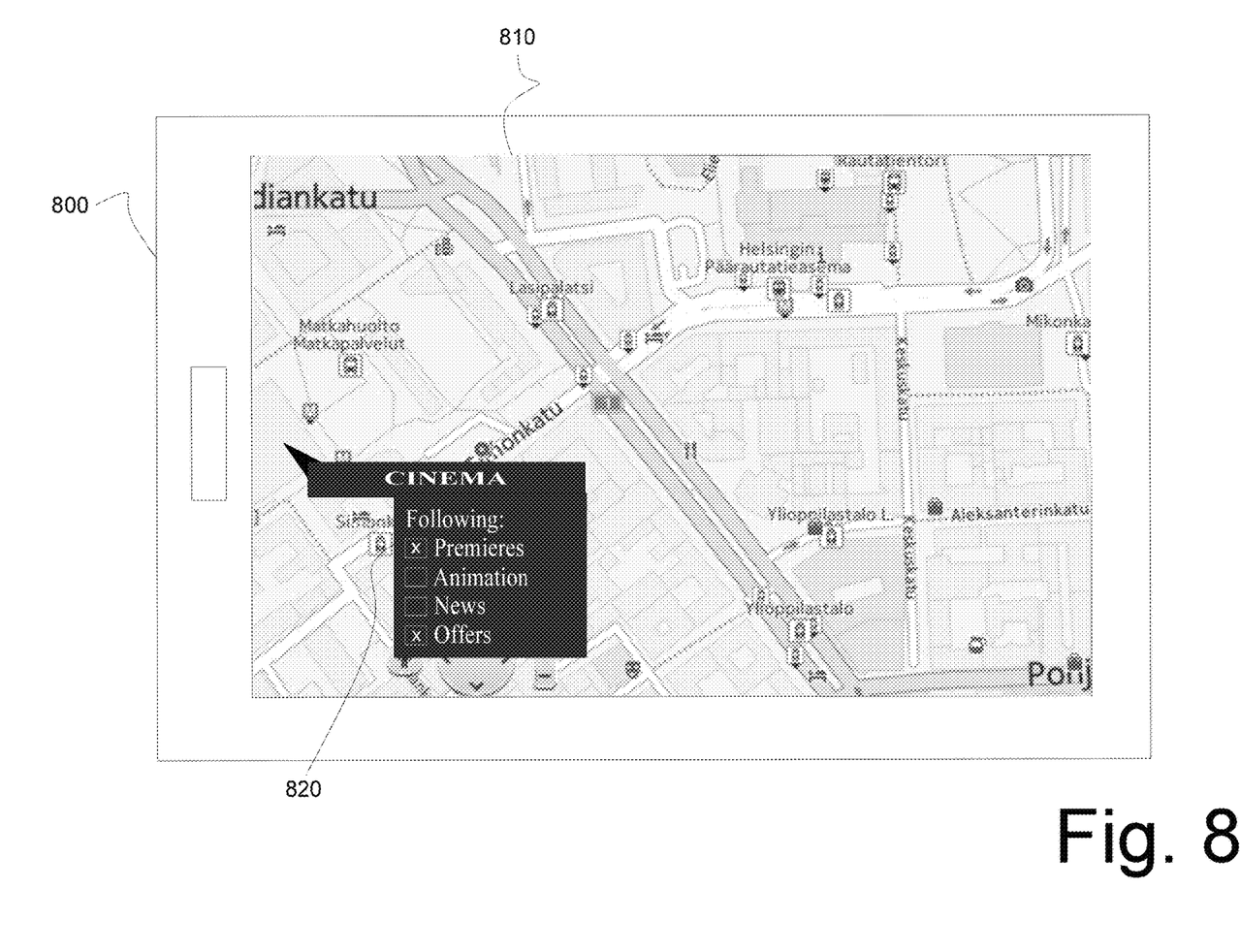
FIG. 8 shows a user interface view of a map application according to an embodiment.
Figure 9:
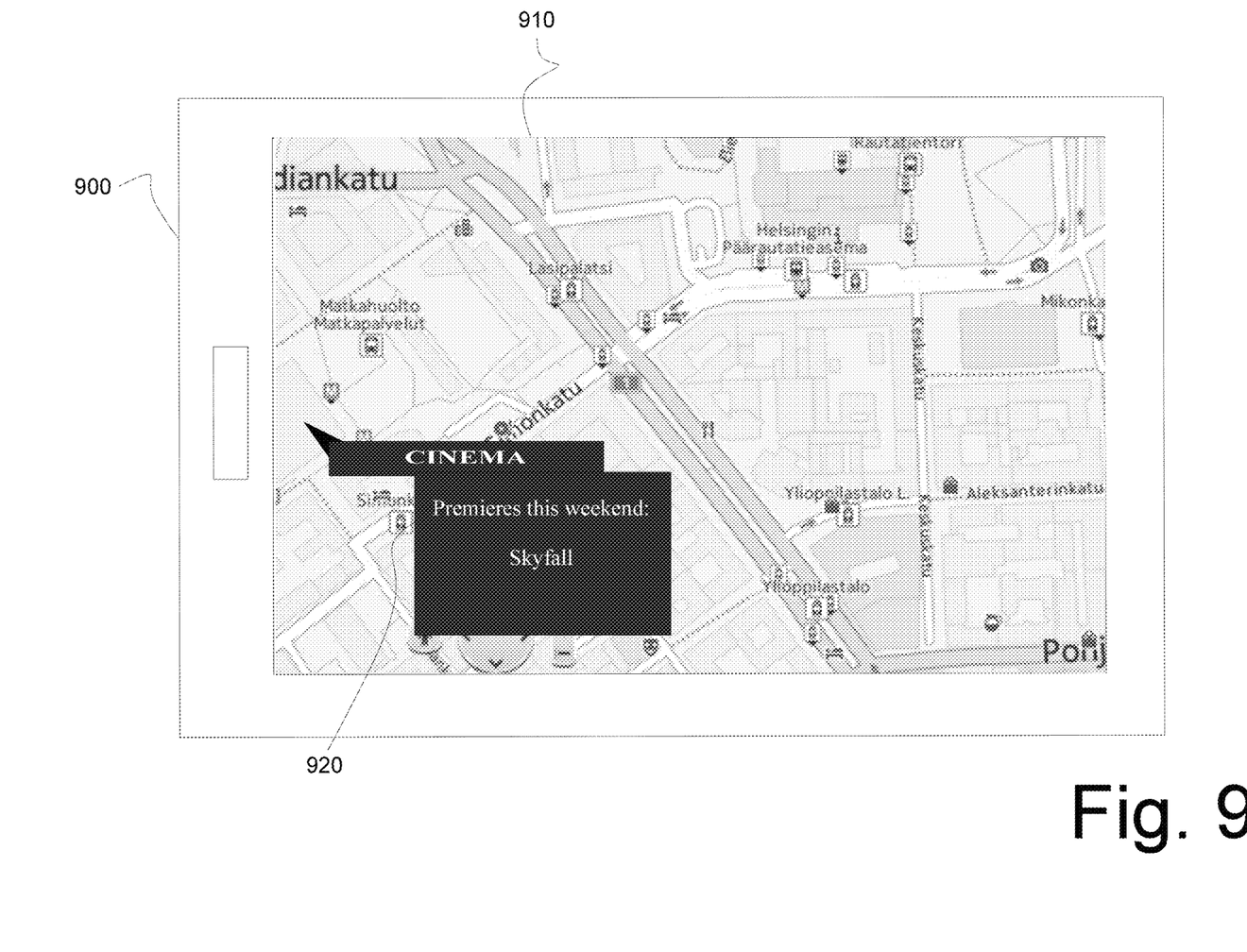
FIG. 9 shows a user interface view of a map application according to an embodiment.

According to another embodiment a location channel subscription for a user is carried out as follows:

FIG. 6 shows the method according to an embodiment, and FIGS. 7 to 9 show user interface views according to embodiments. In this embodiment, the user is viewing maps 710 in the maps application with his/her mobile device 700 (FIG. 7). When the user finds an interesting location (i.e. POI, e.g. "Cinema") from the maps 710, the user may e.g. select a "follow me" button 720 or indicate in some other way his/her interest on the location. When the interest is indicated, the user is directed to login into a user account in a server—if not already being logged in. When the user is logged in, the map application is configured to subscribe the user to the location channel on the notification service. When these steps have been performed, the user is confirmed on the subscription. Thus in an embodiment, show in FIG. 8, in addition to usually shown POI, the user interface of the map application of the device may also show a menu 820 for selecting some services relating to the POI. The services can be for all point-of-interests same but may be also different. The user has the possibility to select what kind of notifications she/he wants to receive. One example of the information the user can provide can be e.g. "I am interested if I am within 5 km from the POI", or "I am usually driving/travelling using public transportation/walking close to certain POI e.g. at 17:00 in the afternoon. I will get the notifications at that time every day and not during weekends." In the example of FIG. 8, the user selects notifications relating to Premieres and Offers. It is realized that the menu may be modified by e.g. the location owner. For example, for a ski resort the menu may include wind and temperature. In addition, the user may follow multiple point-of-interests at the same time, whereby that many notifications can be shown on the map application user interface view. Some of the POIs can be linked to each other, e.g. "I am interested in ski resort, then at one consent I can start to get notifications also from ski shops close to that location or close to the route I will travel to the ski resort". The notifications can then only be visible when the ski resort is the destination and not when the destination is e.g. home. The linked POIs may be different based on the context, e.g. they may differ how long the travel time is, do the user need some other services during the travel. In one embodiment the user can link some places together so that he/she can get the notifications only when two or more criteria are fulfilled.

Figure 10:
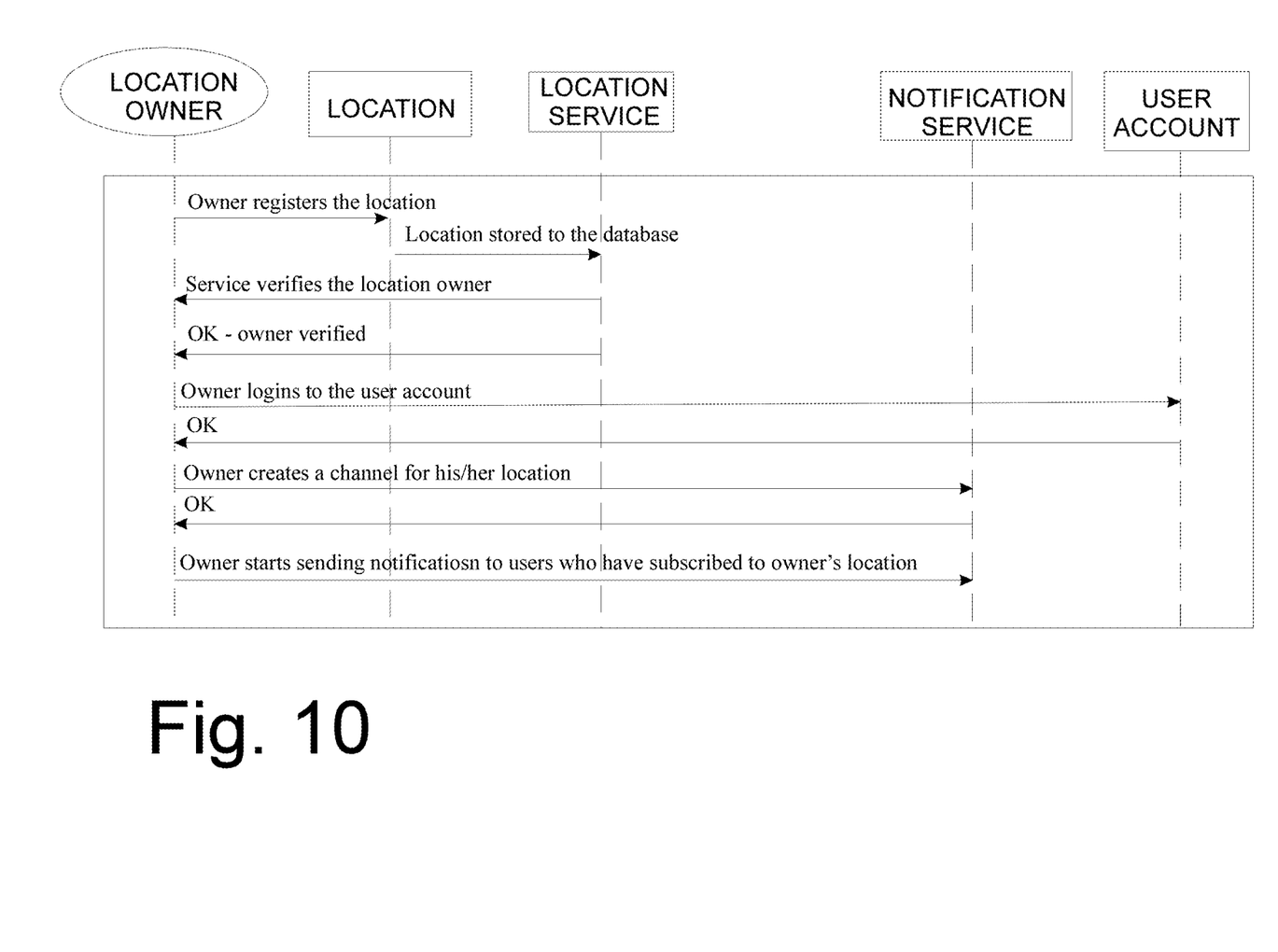
FIG. 10 shows a method for a location owner to create a notification channel according to an embodiment.

As a result of the subscription to the location channel in both embodiments, the notification channel can be used to send user information relating to the location being followed. The information can be provided by a merchant (e.g. a location owner) that has a point of interest in the location. FIG. 10 shows an example of a user interface view for the map application with the followed point-of-interest (Cinema) with the notification 920 relating to Premieres.

Yet if the user is already logged in the account service, she/he does not need to log-in specifically for the registration. The trigger for registration may be triggered also when user is by passing some interesting POIs. If the user is already registered to get the notifications from certain location, the user's received notifications can be arranged in the order of the location of the user or certain notifications can be shown (overlaid) on the map application when user is passing the certain location.

In the following, an example for creating a location channel by a service provider, such as a location owner, is disclosed:

According to an embodiment, a location owner (e.g. a place holder) registers the location to a location service. The registering stores the location to the location database. When the location has been registered, the location service verifies the location owner. After this, the location owner is directed to register to an account service, which account service stores multiple user accounts. Then a location channel can be created for his/her location in the notification service. When the location channel is established, the location owner may start sending locations to those users that have subscribed to his/her location.

In action, the system may operate in following way according to an embodiment:

A consumer (Z) informs to follow a place (Y). The consumer (Z) may perform the informing by clicking a follow button on a location in a map application provided e.g. through a web browser or an embedded application or the like on the apparatus. Instead, the consumer (Z) may perform the informing by checking-in to the place (Y) by means of a certain location networking service. As further alternatives, the consumer (Z) may perform the informing by navigating to the place (Y) with a navigation application or by means of a NFC (Near Field Communication) tag or bar code triggered communication. In the latter case, the consumer may use his/her apparatus to touch a NFC tag or capturing an image from the bar code, whereby a map is displayed on an apparatus of the user (i.e. consumer Z) with that location (specified by a NFC tag or a bar code). Then, a user may be asked if he/she wishes to follow the location. The NFC tag can be located in the actual physical location (e.g. at restaurant) or at an information desk (e.g. tourist info), where the user is able to touch the tag. However, this is not a requirement and the NFC tag can be located anywhere, where the user is able to touch it. The bar code can be located in an advertisement (in paper or electronic form) or in a product, where it can be captured.

In the previous examples, a dialog is displayed to the consumer (Z) to ask whether or not he/she wishes to be listed as one of the followers of the place (Y). However, there are also other possibilities to query user's interest in the location. For example, when selecting a location on a map, there can be pop-up-view with selectable buttons for e.g. Yes (to follow) with optional No (not to follow).

When the user has subscribed to the location (i.e. indicated his/her interest to follow the location) the location owner (X) can send messages by push-notification method to all consumers, who have wished to be listed as the followers of the place (Y). The messages being sent are somehow related to the place (Y), for example campaigns, news, advertisements, happenings etc. The message being sent can be location based or time based. For example, the message is sent only such consumers that are in a certain location. The message can also be targeted to some of the consumers, e.g. only to female consumers, or only to consumers interested in Star Wars, etc. The message can be shown on a map application, or in the apparatus.

The push-notification message can be delivered by any known messaging methods, e.g. short message (SMS), multimedia message (MMS), email from the notification service. Also, as mentioned previously, the notification can be linked with the map application, so that the user sees the notification for a location being overlaid on said location on the map. For example, when the user has received notifications relating to point-of-interests, the notifications are analyzed (to find POI related notifications) in the user apparatus and those which relate to certain POIs will be transmitted to a maps application and they are visible in those POI locations. The notifications can also be clickable to open, or the POI notifications are collected in a notification inbox (i.e. mailbox) of the maps application.

When user e.g. navigating from a location A to a location C and user has subscribed the POI notifications for location B which is visible in the map view. While the user is driving the route, the user can be informed on the notification in location B in different ways (visually, audibly, etc.).

In above, it was disclosed that a customer may inform to follow a certain location by checking-in said location by means of a certain location networking service. However, in such a case, a subscription relationship is not necessary. When the location networking service is external to the location service, the subscription can be created (if the customer wants) between the location and the customer, when the customer makes check-out-procedure for the location. This can be done automatically.

In the above, the location owner may be a company, a private person, a publisher, etc. The location (i.e. place) can be point-of-interest (POI), e.g. a shop, a service, a restaurant, a hotel, a night club, an attraction, sights, a vantage point, etc. The consumer (i.e. customer) is an end user having an apparatus for using aforementioned applications. The location service can be a web service storing company information with respective places being added by the company, which places can be brought to the map application.

Figure 11:
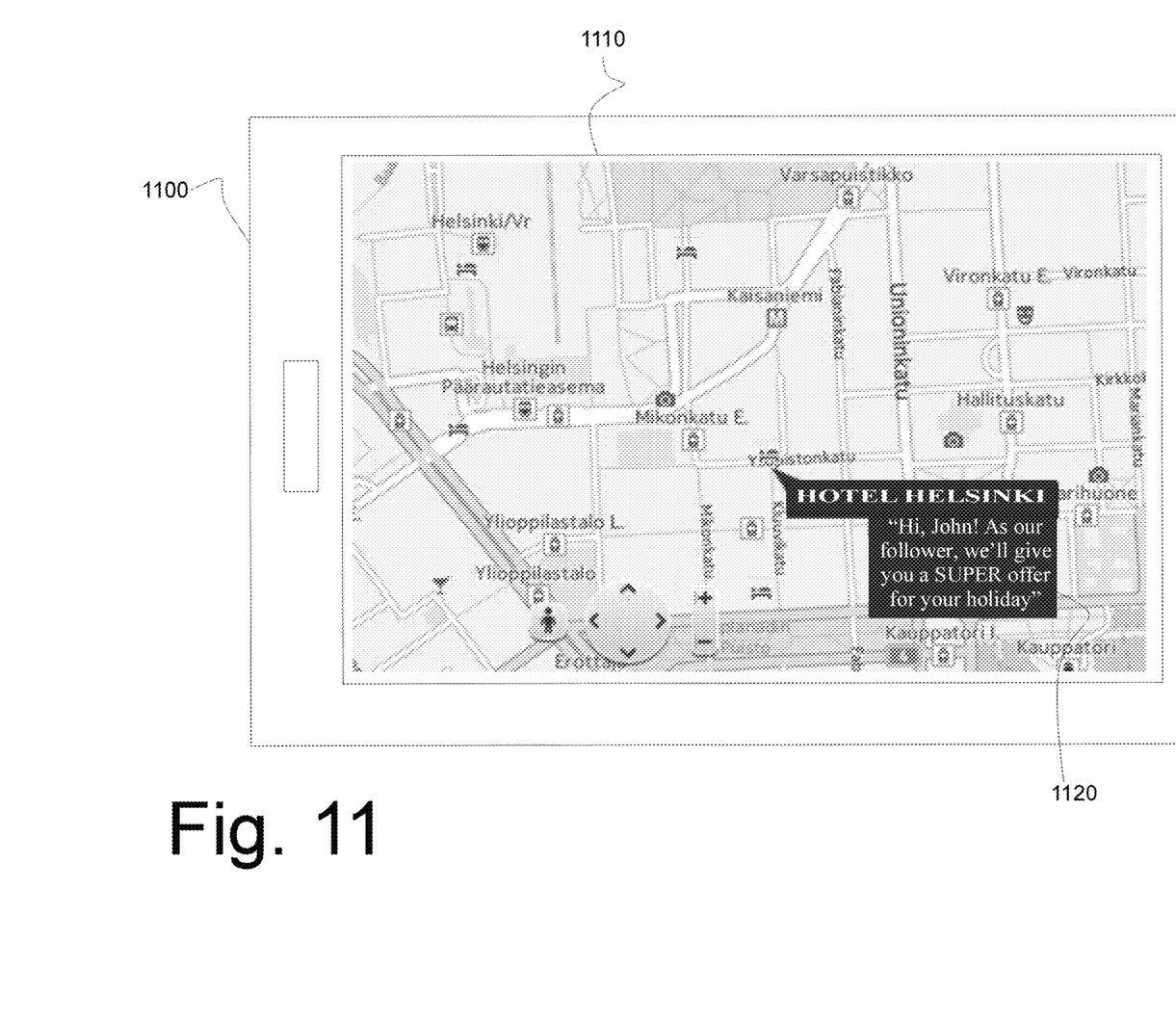
FIG. 11 shows a user interface view of a map application according to an embodiment.

FIG. 11 shows an apparatus with a user interface view according to yet another embodiment. In this embodiment, the apparatus is e.g. a smart phone 1100 having a display 1110 being configured to display a map. By means of the notification service according to embodiments, the notifications can be shown on the map together with the followed place. In FIG. 11, a follower "John" has indicated his interest on the place "Hotel Helsinki", whereby the notifications e.g. the one shown with reference 1120 from "Hotel Helsinki" to "John" is directly transmitted to a map application of "John's" smart phone 1100 regardless whether "John" is located at the moment. This means that "John" does not need to be near "Hotel Helsinki" in order to get notifications from it.

In one further embodiment, when the user has received notifications relating to POIs, the notifications are analyzed (to find POI related notifications) and those which relate to certain POIs will be moved to map application and they are visible in certain POIs, or the notifications are clickable to open, or the POI notifications are collected like in to a Map application inbox. When a user is e.g. navigating from a location A to a location C, and a location B is somewhere in the middle of the route and the user has subscribed the POI notifications in location B which is visible in the map view at least once when driving the route, the user can be notified about the notification in location B in different ways (visually, audibly, etc.). The notifications received by the mobile device are handled based on the category of the notification. If the map application category in the notification is valid, then the notification is handled in the device so that the notification is e.g. shown only in the map application and when map application is open. The map application further can check the validity of the notification when the map application is opened and during the time the map application is open and based on the analysis will either inform that there are new notifications or the notification is not any more valid and if it is not valid will delete it. In case of valid notification the notification can be added to the list of items to one corner of the display from which they can be selected like inbox. The messages can be scrolled and selected to show the content of the notification. Either the content of message of the notification is shown on the map application or when opened it will find on the map application also the place which the message relates to. The notification can comprise e.g. geo-coordinates, category of the notification (=e.g. application name), POI name, urgency, validity period/time (e.g. until Dec. 24, 2012).

In one embodiment the activation of the subscription to notifications may occur by long pressing in the touch screen for an agreed time period the respective POI. This kind activated POI may be illustrated to the user by bold text or the color code in the map so that it is different from the other POIs which have not been activated to receive the notifications. The deactivation may occur by long pressing the respective POI in the touch screen and the color or the like will change back. This kind embodiment will further improve the user experience.

In one embodiment a search service could be further improved. The notifications are not shown to users at all in map app as separate items. Thus they are like hidden in the map app. That avoids the user to filter or see all notifications she/he receives in the device. In one embodiment the map (or POI) related notifications can be classified so that they will be activated only if the user makes a search relating to that relevancy and they are also illustrated maybe only in connection with POI as integrated to the POI as additional portions of information in the search results. In one embodiment a user can do search in a map application where the word hungry, hotel, food, ice hockey or the like can be used as search terms. The POIs related to these words are shown and at the same time the possible notifications in each POI are added to show additional and updated content in POIs. This will avoid that user would need to go through the number of notifications separately. However it depends how the user wants to see the notifications. Also the search area (e.g. location) may also reflect the search results, i.e. only the specific area POIs are updated in the search, thus reducing the search time.

The present embodiments make it possible to create a subscription between the point-of-interest and the user, so that the user can follow the point-of-interest and get notifications every time the location owner (e.g. a merchant) updates e.g. its offers, regardless of the location of the user. Therefore, the user does not have to visit the point-of-interest to get the notifications.

The various embodiments of the invention can be implemented with the help of computer program code that resides in a memory and causes the relevant apparatuses to carry out the invention. For example, an end-user device (i.e. apparatus) may comprise circuitry and electronics for handling, receiving and transmitting data, computer program code in a memory, and a processor that, when running the computer program code, causes the device to carry out the features of an embodiment. For example, a network device, such as a server, may comprise circuitry and electronics for handling, receiving and transmitting data, computer program code in a memory, and a processor that, when running the computer program code, causes the device to carry out the features of an embodiment.

According to an embodiment, the computer program product embodied on a non-transitory computer readable medium, comprising computer program code configured to, when executed on at least one processor, cause a server to: receive an indication from a client device, which indication relates to a location; create a subscription between the client and the location owner of said location being selected, and based on the subscription, transmit notifications relating to the location to the client device.

According to an embodiment, the computer program product embodied on a non-transitory computer readable medium, comprising computer program code configured to, when executed on at least one processor, cause an apparatus to: select a location; transmit an indication relation to said location to a server to have a subscription with a location owner of said location; based on the subscription, receive notifications from the location owner.

It is obvious that the present invention is not limited solely to the above-presented embodiments, but it can be modified within the scope of the appended claims.

What is claimed is:

1. A method comprising:
receiving, via a network at an apparatus, an indication of navigation from an electronic map application of a user device;
receiving, at the apparatus from the user device, a checking-in at a physical location via the user device to subscribe to a location channel that is set by a location owner of the location and available within a predetermined distance from the location; and
initiating a transmission of push notifications relating to the location via the location channel to the user device at the location and during one or more subsequent navigations passing via the location based, at least in part, on the subscription.

2. A method of claim 1, further comprising:
continuing the transmission of the push notifications relating to the location to the user device at the location and during the one or more subsequent navigations; and ending the transmission of the push notifications relating to the location to the user device after leaving the location.

3. A method of claim 1, wherein:
the checking-in of the location is via interaction of the user device with a near field communication tag or a bar code triggered communication located at the location.

4. A method of claim 1,
wherein the subscription defines an application to present a respective one of the push notifications and a validity time period of the respective push notification.

5. A method of claim 4, wherein the push notifications are transmitted via a messaging service, and wherein the application is a transportation application that facilitates user travel using public transportation.

6. A method of claim 1, wherein the push notifications are presented in a map together with the location via the electronic map application at the user device.

7. A method of claim 1, further comprising
initiating a transmission of one or more other push notifications relating to one or more updates of the location made by the location owner;
wherein the push notifications comprise at least one of a category, a subclass, or a combination thereof.

8. A method comprising:
receiving, at a user device, an indication of navigation from an electronic map application;
receiving, at the user device, a checking-in at a physical location in the electronic map application;
subscribing, by the user device, to a location channel that is set by a location owner of the location and available within a predetermined distance from the location;
receiving, by the user device, push notifications from the location channel at the location and during one or more subsequent navigations passing via the location; and
filtering and presenting, at the user device, one or more valid push notifications among the push notifications based, at least in part, on the subscription.

9. A method of claim 8, wherein the location is selected from an electronic map.

10. A method of claim 8, wherein the location is selected based, at least in part, on where the user device is located.

11. A method of claim 8, wherein the selection of the location comprises receiving the location from an identification tag.

12. A method of claim 8, wherein the checking-in of the location is via interaction of the user device with a near field communication tag or a bar code triggered communication located at the location.

13. A method of claim 8, wherein the one or more push notification are received via a messaging service.

14. A method of claim 8, wherein the push notifications are presented in a map together with the non virtual location via the electronic map application at the user device.

15. An apparatus comprising:
at least one processor; and
at least one memory including computer program code for one or more programs,
the at least one memory and the computer program code configured to, with the at least one processor, cause the apparatus to perform at least the following,
receive, via a network, an indication of navigation from an electronic map application of a user device;
receive, from the user device, a checking-in at a physical location via the user device to subscribe to a location channel that is set by a location owner of the location and available within a predetermined distance from the location; and
initiate a transmission of push notifications relating to the location via the location channel to the user device at the location and during one or more subsequent navigations passing via the location based, at least in part, on the subscription.

16. An apparatus of claim 15, wherein the location relates to a place on an electronic map.

17. An apparatus of claim 15, wherein the apparatus is further caused to:
transmit the push notifications to a map to be displayed with the location.

18. An apparatus of claim 15, wherein the push notifications comprise at least one of a category, a subclass, or a combination thereof.

19. An apparatus comprising:
at least one processor; and
at least one memory including computer program code for one or more programs,
the at least one memory and the computer program code configured to, with the at least one processor, cause the apparatus embedded in a user device to perform at least the following,
receive an indication of navigation from an electronic map application;
receive a checking-in at a physical location in the electronic map application;
subscribe to a location channel that is set by a location owner of the location and available within a predetermined distance from the location;
receive push notifications from the location channel at the location and during one or more subsequent navigations passing via the location; and
filter and present, at the user device, one or more valid push notifications among the push notifications based, at least in part, on the subscription.

20. An apparatus of claim 19, wherein the apparatus is further caused to:
receive the push notifications on a map being displayed with the location.

21. A method of claim 1, further comprising:
receiving a registration of the location by the location owner;
initiating a storage of the location to a database;
receiving a log in to a user account by the location owner; and
creating the location channel of the location for the location owner.

22. A method of claim 8, wherein the subscription between the user device and the location owner of the location is achieved by:
a registration of the location by the location owner;
a storage of the location to a database;
a log in to a user account by the location owner; and
a creation of the location channel of the location for the location owner.

* * * * *